United States Patent
Lee et al.

(10) Patent No.: US 7,953,173 B2
(45) Date of Patent: May 31, 2011

(54) APPARATUS AND METHOD FOR SELECTING A MULTI-ANTENNA TRANSMISSION METHOD IN A BROADCASTING SYSTEM

(75) Inventors: Hak-Ju Lee, Incheon (KR); Sung-Ryul Yun, Suwon-si (KR); Kook-Heui Lee, Suwon-si (KR); Dong-Seek Park, Yongin-si (KR); Jae-Yoel Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 663 days.

(21) Appl. No.: 12/048,742

(22) Filed: Mar. 14, 2008

(65) Prior Publication Data

US 2008/0225983 A1    Sep. 18, 2008

(30) Foreign Application Priority Data

Mar. 14, 2007   (KR) ................ 10-2007-0024820

(51) Int. Cl.
   *H04B 7/02* (2006.01)
(52) U.S. Cl. ..................................... 375/267
(58) Field of Classification Search ............ 375/260, 375/267, 299
   See application file for complete search history.

(56) References Cited

U.S. PATENT DOCUMENTS

| 7,742,681 B2 * | 6/2010 | Yamagata et al. ......... 386/258 |
| 2006/0083195 A1 | 4/2006 | Forenza et al. |
| 2007/0280232 A1 * | 12/2007 | Dec et al. ................ 370/390 |
| 2010/0260259 A1 * | 10/2010 | Kimmich et al. ......... 375/240.07 |

FOREIGN PATENT DOCUMENTS

| KR | 10-2006-0085422 A | 7/2006 |
| KR | 10-0705958 B1 | 4/2007 |

* cited by examiner

*Primary Examiner* — Don N Vo
(74) *Attorney, Agent, or Firm* — Jefferson IP Law, LLP

(57) ABSTRACT

An apparatus and a method for transmitting broadcasting signals in a broadcasting system having multi-antenna are provided. The apparatus comprises at least one antenna, a signal generator for generating two or more broadcasting signals to be transmitted, at least two of the two or more broadcasting signals being generated according to different user-required quality characteristics, a multi-antenna modulator for modulating each of the broadcasting signals according to one of a plurality of multi-antenna transmission methods selected for each of the broadcasting signals according to the user-required quality characteristics of the respective broadcasting signals, and a transmitter for transmitting the modulated signals via the at least one antenna.

23 Claims, 9 Drawing Sheets

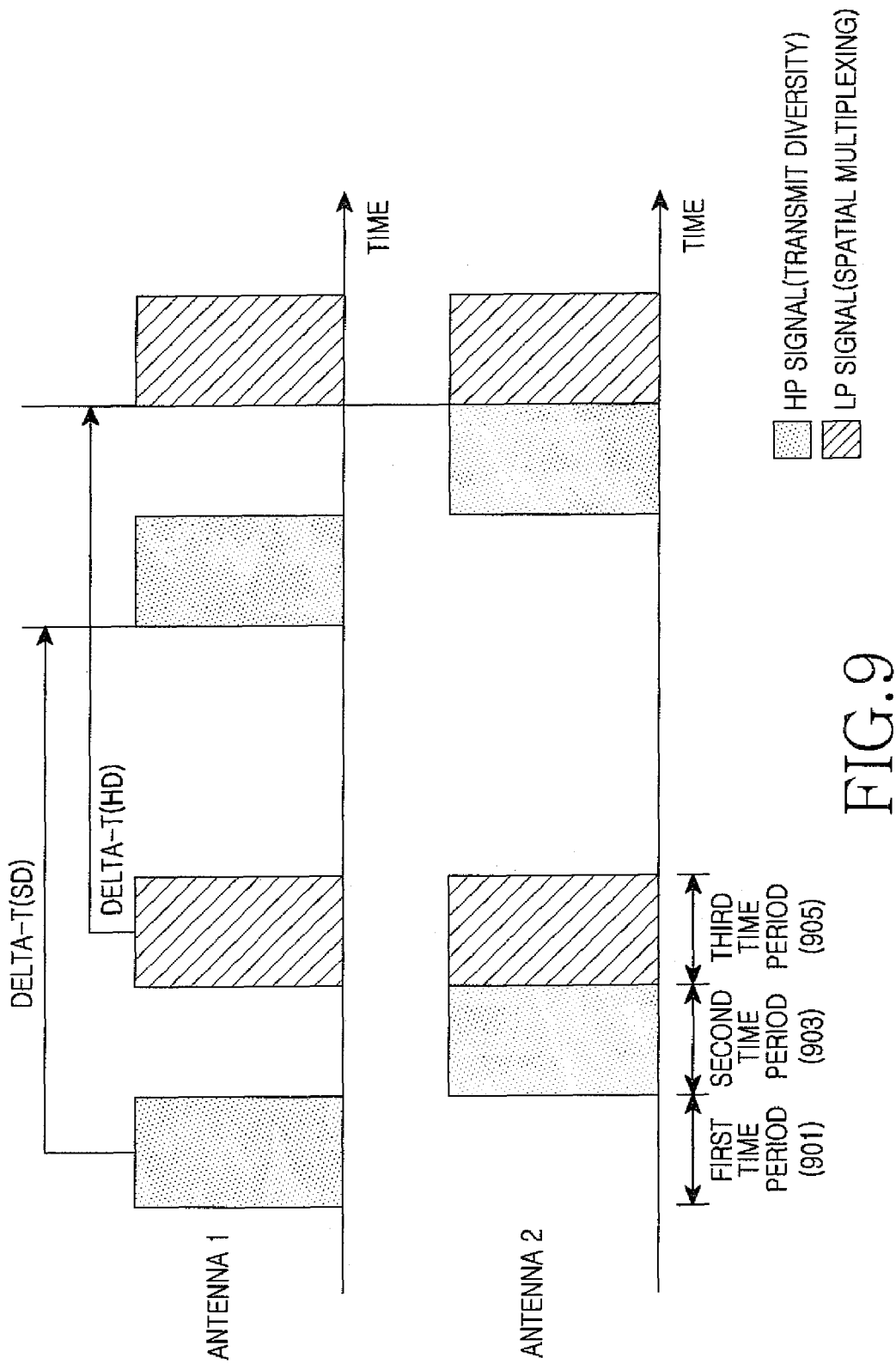

APPARATUS AND METHOD FOR SELECTING A MULTI-ANTENNA TRANSMISSION METHOD IN A BROADCASTING SYSTEM

PRIORITY

This application claims the benefit under 35 U.S.C. §119(a) to a Korean patent application filed in the Korean Intellectual Property Office on Mar. 14, 2007 and assigned Ser. No. 2007-24820, the entire disclosure of which is hereby incorporated by reference.

BACKGROUND OF THE INVENTION

1. Field of the Invention

The present invention relates to a broadcasting system. More particularly, the present invention relates to an apparatus and method for selecting a multi-antenna transmission method in a broadcasting system.

2. Description of the Related Art

With the evolution of communication technologies, next generation broadcasting systems are being developed that support high definition and high transmission capacity. However, next generation broadcasting systems will need to support both a conventional broadcasting standard which requires a high priority bit stream (hereinafter, referred to as HP) having low definition but a high priority and a next generation broadcasting standard requiring a low priority bit stream (hereinafter, referred to as LP) which has a low priority but supports high definition and a high transmission capacity.

The broadcasting system structured as shown in FIG. 1 supports both the HP signal and LP signal. Here, FIG. 1 illustrates a configuration of a broadcasting system defined in a Digital Video Broadcasting (DVB)-Terrestrial (T) standard, which is a European terrestrial broadcasting standard.

FIG. 1 illustrates a configuration of a conventional broadcasting system.

As shown in FIG. 1, a transmission terminal, such as a DVB-Handheld (H) terrestrial channel adapter, of the broadcasting system comprises energy diffusers 100, external coders 102, external interleavers 104, internal coders 106, internal interleavers 108, a modulator 110, a resource allocator 112, an orthogonal frequency division multiplex (OFDM) modulator 114, a digital/analog converter (DAC) 116, a radio frequency (RF) processor 118 and a control signal generator 120. Here, energy diffusers 100 comprise energy diffuser 100-1 and energy diffuser 100-2 which are configured to process the HP signal and LP signal, respectively. The external coders 102 comprise external coder 102-1 and external coder 102-2 which are configured to process the HP signal and LP signal, respectively. The external interleavers 104 comprise external interleaver 104-1 and external interleaver 104-2 which are configured to process the HP signal and LP signal, respectively. The internal coders 106 comprise internal coder 106-1 and internal coder 106-2 which are configured to process the HP signal and the LP signal, respectively.

The energy diffusers 100 evenly distribute energy through a scrambling process so that identical bits cannot be repeated in signals (bit streams) supplied from video coders.

The external coders 102 code the signals supplied from the energy diffusers 100 according to corresponding modulation level to correct errors in the transmission signal.

The external interleavers 104 interleave the signals supplied from the external coders 102 according to a preset rule to prevent burst errors.

The internal coders 106 code the signals supplied from the external interleaver 104 to correct the distributed bit errors of the signals. In this case, the internal coder 106 may use a coding mode identical to or different from that of the external coder 102.

The internal interleaver 108 interleaves the signals supplied from the internal coders 106 bit by bit according to a preset rule. In this case, the internal interleaver 108 combines the LP signal and the HP signal into one stream (signal) and outputs the stream.

The modulator 110 modulates and outputs the signal supplied from the internal interleaver 108 according to corresponding modulation level.

The control signal generator 120 generates a control signal including synchronization channel and resource information for allocating signals to be transmitted. In addition, the control signal generator 120 generates a control signal including transmission parameter signaling (TPS) information. Here, the TPS information represents information for time division to reduce power loss in the broadcasting system. In this case, when performing the time division, the broadcasting system transmits data as shown in FIG. 2.

FIG. 2 illustrates a data transmission mode of a conventional broadcasting system.

As shown in FIG. 2, the broadcasting system transmits a stream as a burst 201 having a high data rate for a short time (burst region 203), and operates in a transmission standby mode for a preset time (off time 205). While the burst bandwidth 207 is relatively high during the burst region 203, the average bandwidth 209 of the time period including burst region 203 and the off time 205 is comparatively low. By operating in this manner, power loss of the broadcasting system is able to be reduced.

As described above, the broadcasting system transmits a stream at a high data rate for a short time and then operates in a transmission standby mode for a preset time, thereby reducing power loss.

The resource allocator 112 allocates the data signal supplied from the modulator 110 and the control signal supplied from the control signal generator 120 to a corresponding resource and outputs the data signal and the control signal.

The OFDM modulator 114 inverse-fast-Fourier transforms the frequency domain signal supplied from the resource allocator 112 to convert it into a time domain signal.

The DAC 116 converts the digital signal supplied from the OFDM modulator 114 into an analog signal and outputs the analog signal.

The RF processor 118 modulates the base-band signal supplied from the DAC 116 into a radio frequency signal and outputs the radio frequency signal.

When using a multi-antenna, the broadcasting system transmits data using independent channels, thereby increasing transmission reliability and data rate without utilizing additional frequency resources or transmission power. For example, the broadcasting system can increase a data rate through a spatial multiplexing using a multi-antenna. Additionally, the broadcasting system can enhance transmission reliability through a diversity method using a multi-antenna.

Accordingly, it is advantageous for a broadcasting system to use a multi-antenna to employ a diversity method to improve reliability of the HP signal and employ a spatial multiplexing method to enhance a data rate of the LP signal.

However, the conventional broadcasting system combines the HP signal and the LP signal into one stream and transmits it. Therefore, the broadcasting system cannot apply different multi-antenna transmission methods to the HP signal and the LP signal. Instead the conventional broadcasting system employs only a single multi-antenna transmission method. That is, even though the broadcasting system uses a multi-antenna, it cannot satisfy both characteristics of the HP signal and LP signal. Therefore, a need exists for an apparatus and method that addresses the issues described above that are associated with the conventional broadcasting system.

SUMMARY OF THE INVENTION

An aspect of the present invention is to address at least the above-mentioned problems and/or disadvantages and at least the advantages described below. Accordingly, an aspect of the present invention is to provide an apparatus and method for transmitting broadcasting signals using a multi-antenna in a broadcasting system.

Another aspect of the present invention is to provide an apparatus and method for applying a multi-antenna transmission method according to characteristics of broadcasting signals in a broadcasting system using a multi-antenna.

Still another aspect of the present invention is to provide an apparatus and method for applying a time division technique to respective antennas in a broadcasting system using a multi-antenna.

According to an aspect of the present invention, a signal transmission method in a broadcasting system using at least one antenna is provided. The method includes generating two or more broadcasting signals, at least two of the two or more broadcasting signals being generated according to different user-required quality characteristics, selecting one of a plurality of multi-antenna transmission methods for each of the broadcasting signals according to the user-required quality characteristics of the respective broadcasting signals, modulating respective broadcasting signals according to the selected multi-antenna transmission method for each of the broadcasting signals, and transmitting the modulated broadcasting signals via the at least one antenna.

According to another aspect of the present invention, a transmission apparatus in a broadcasting system is provided. The apparatus includes at least one antenna, a signal generator for generating two or more broadcasting signals to be transmitted, at least two of the two or more broadcasting signals being generated according to different user-required quality characteristics, a multi-antenna modulator for modulating each of the broadcasting signals according to one of a plurality of multi-antenna transmission methods selected for each of the broadcasting signals according to the user-required quality characteristics of the respective broadcasting signals, and a transmitting unit for transmitting the modulated signals via the at least one antenna.

Before undertaking the DETAILED DESCRIPTION OF EXEMPLARY EMBODIMENTS below, it may be advantageous to set forth definitions of certain words and phrases used throughout this disclosure: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this disclosure, those of ordinary skill in the art should understand that in many, if not most instances, such definitions apply to prior, as well as future uses of such defined words and phrases.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIG. 9 is a diagram illustrating a time division structure of transmission data in a broadcasting system according to a further exemplary embodiment of the present invention.

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness. Those skilled in the art will understand that the principles of the present disclosure may be implemented in any suitably arranged broadcasting system.

Hereinafter, a description will be made on a technique for applying a multi-antenna transmission method according to broadcasting quality characteristics required by users in a broadcasting system using a multi-antenna.

The broadcasting system transmits a high priority bit stream (hereinafter, referred to as HP) having low definition but a high priority and a low priority bit stream (hereinafter, referred to as LP) having a low priority but supporting high definition and high transmission capacity. In this case, the broadcasting system transmits the HP signal using a diversity method and the LP signal using a spatial multiplexing method. However, other methods for the transmission of the HP signal and LP signal may be used.

In the following description, an example of a broadcasting system using an orthogonal frequency division multiplexing (OFDM) access method will be discussed. However, exemplary embodiments of the present invention are also applicable to a broadcasting system using another communication method.

In the description, it is assumed that the broadcasting system operates consistent with a DVB (Digital Video Broadcasting)-T (Terrestrial) standard, which is a European terrestrial broadcasting standard. However, exemplary embodiments of the present invention can also be applied to a broadcasting system operating consistent with another broadcasting standard.

Figure 1:
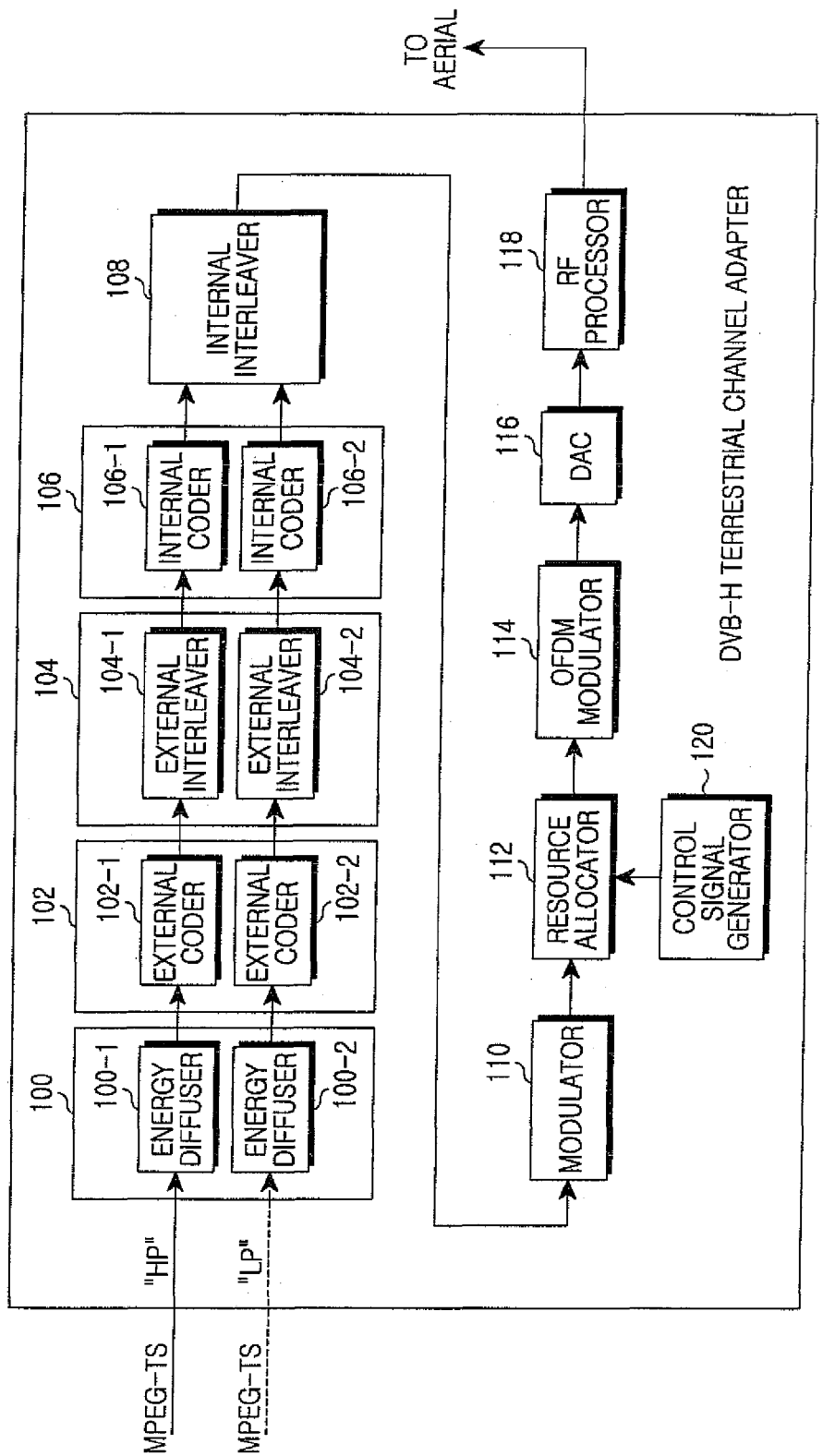
FIG. 1 is a diagram illustrating a conventional broadcasting system.
Figure 2:
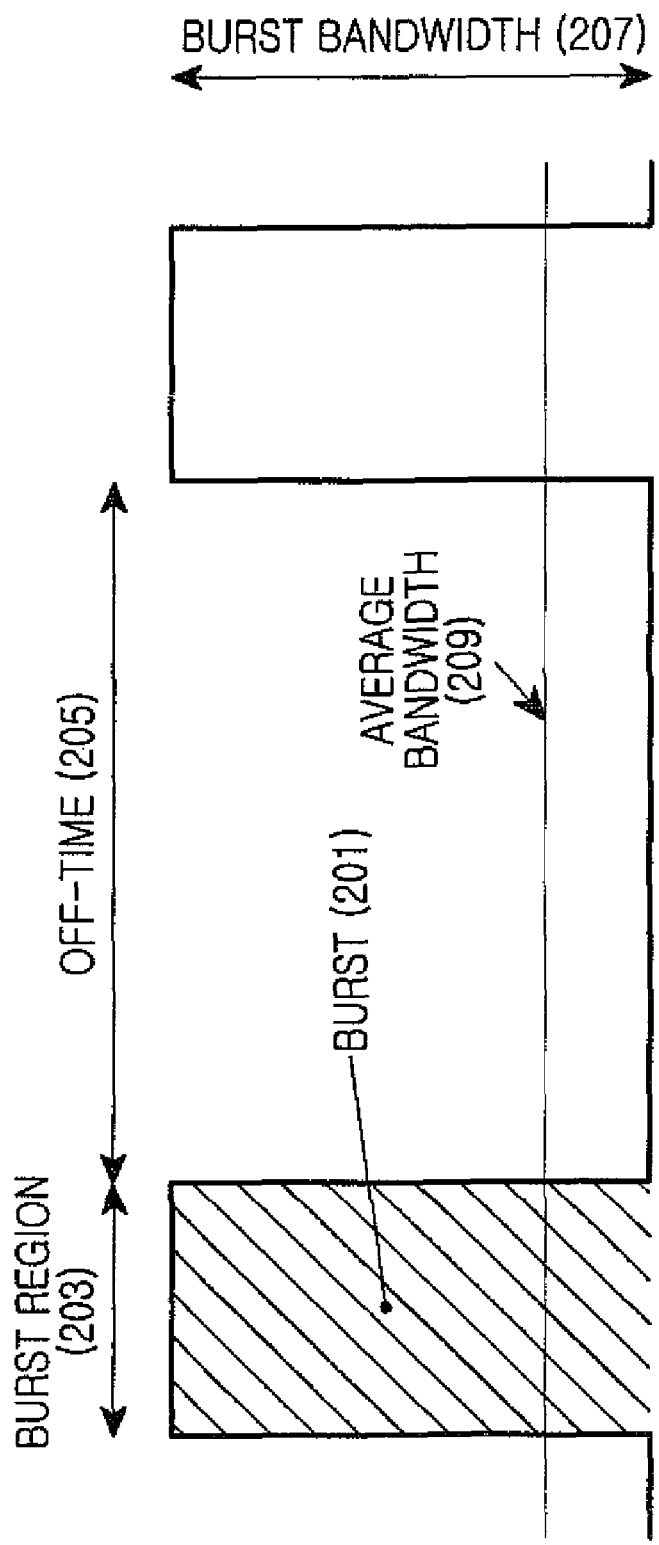
FIG. 2 is a diagram illustrating a data transmission method of a conventional broadcasting system.
Figure 3:
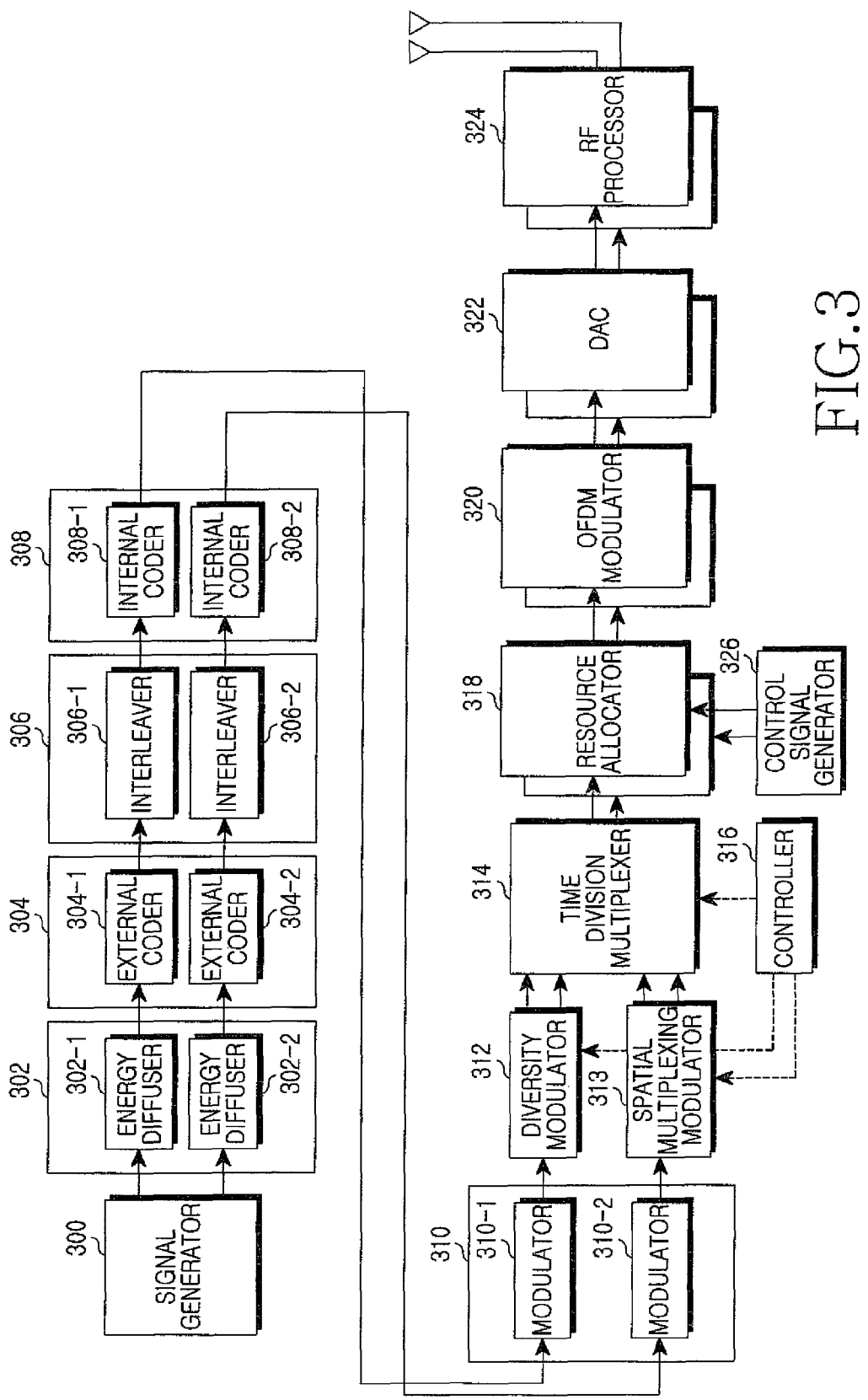
FIG. 3 is a diagram illustrating a configuration of a broadcasting system using a multi-antenna according to an exemplary embodiment of the present invention.

FIG. 3 illustrates a configuration of a broadcasting system using a multi-antenna according to an exemplary embodiment of the present invention. Here, two antennas are used for the broadcasting as an example. However, exemplary embodiments of the present invention are applicable when more than two antennas are used for the broadcasting.

As shown in FIG. 3, a transmission terminal of the broadcasting system comprises a signal generator 300, energy diffusers 302, external coders 304, interleavers 306, internal coders 308, modulators 310, a diversity modulator 312, a spatial multiplexing modulator 313, a time division multiplexer 314, a controller 316, resource allocators 318, OFDM modulators 320, digital/analog converters (DACs) 322, Radio Frequency (RF) processors 324, and a control signal generator 326. Here, the energy diffusers 302 comprise energy diffuser 302-1 and energy diffuser 302-2 which are configured to process the HP signal and LP signal, respectively. The external coders 304 comprise external coder 304-1 and external coder 304-2 which are configured to process the HP signal and LP signal, respectively. The interleavers 306 comprise interleaver 306-1 and interleaver 306-2 which are configured to process the HP signal and the LP signal, respectively. The internal coders 308 comprise internal coder 308-1 and internal coder 308-2 which are configured to process the HP signal and LP signal, respectively. The modulators 308 comprise modulator 310-1 and modulator 310-2 which are configured to process the HP signal and LP signal, respectively. One of each of the resource allocators 318, OFDM modulators 320, digital/analog converters (DACs) 322 and RF processors 324 may be provided for each antenna of the multi-antenna.

First, the signal generator 300 generates and outputs the HP signal and the LP signal. The signal generator 300 may generate the HP signal and the LP signal using a scalable video coding. For example, the signal generator may use an H.264 codec. The generation of the HP signal and the LP signal may be achieved by any number of any of a creation of a signal, a separation of a single into more or more signals, a conversion of a first signal into a second signal, or the like.

The energy diffusers 302 perform a scrambling for the HP signal and the LP signal to prevent an identical bit from being repeated in the HP signal and the LP signal supplied from the signal generator 300.

The external coders 304 code the HP signal and the LP signal supplied from the energy diffuser 302 according to corresponding modulation level to correct errors.

The interleavers 306 interleave the HP signal and the LP signal supplied from the external coders 304 according to a preset rule to prevent burst errors.

The internal coders 308 code the HP signal and the LP signal to correct dispersed bit errors in the HP signal and LP signal supplied from the interleavers 306. In this case, the internal coders 308 may use a coding method identical to or different from that of the external coders 304.

The modulators 310 modulate the HP signal and the LP signal supplied from the internal coders 308 according to a corresponding modulation level and outputs the signals.

The diversity modulator 312 modulates the HP signal supplied from the modulator 310-1 according to a control of the controller 316 to transmit the HP signal using a diversity method. For example, the diversity modulator 312 modulates the HP signals into signals corresponding to respective antennas by using an Alamouti code.

The spatial multiplexing modulator 313 modulates the LP signal supplied from the modulator 310-2 according to a control of the controller 316 to transmit it using a spatial multiplexing method. For example, the spatial multiplexing modulator 313 modulates the LP signals into signals corresponding to respective antennas by using a BLAST (Vertical Bell Labs Layered Space-Time) method. In this case, to apply the BLAST method, the spatial multiplexing modulator 313 associates odd number symbols of a signal supplied from the second modulator 310-2 with a first antenna and associates even number symbols with a second antenna.

The time division multiplexer 314 divides the signals supplied from the diversity modulator 312 and the spatial multiplexing modulator 313 according to a time division structure under a control of the controller 316. For example, when using a time division method as illustrated in FIG. 5, the time division multiplexer 314 time-divides and transmits the HP signal and the LP signal according to a control of the controller 316.

Figure 5:
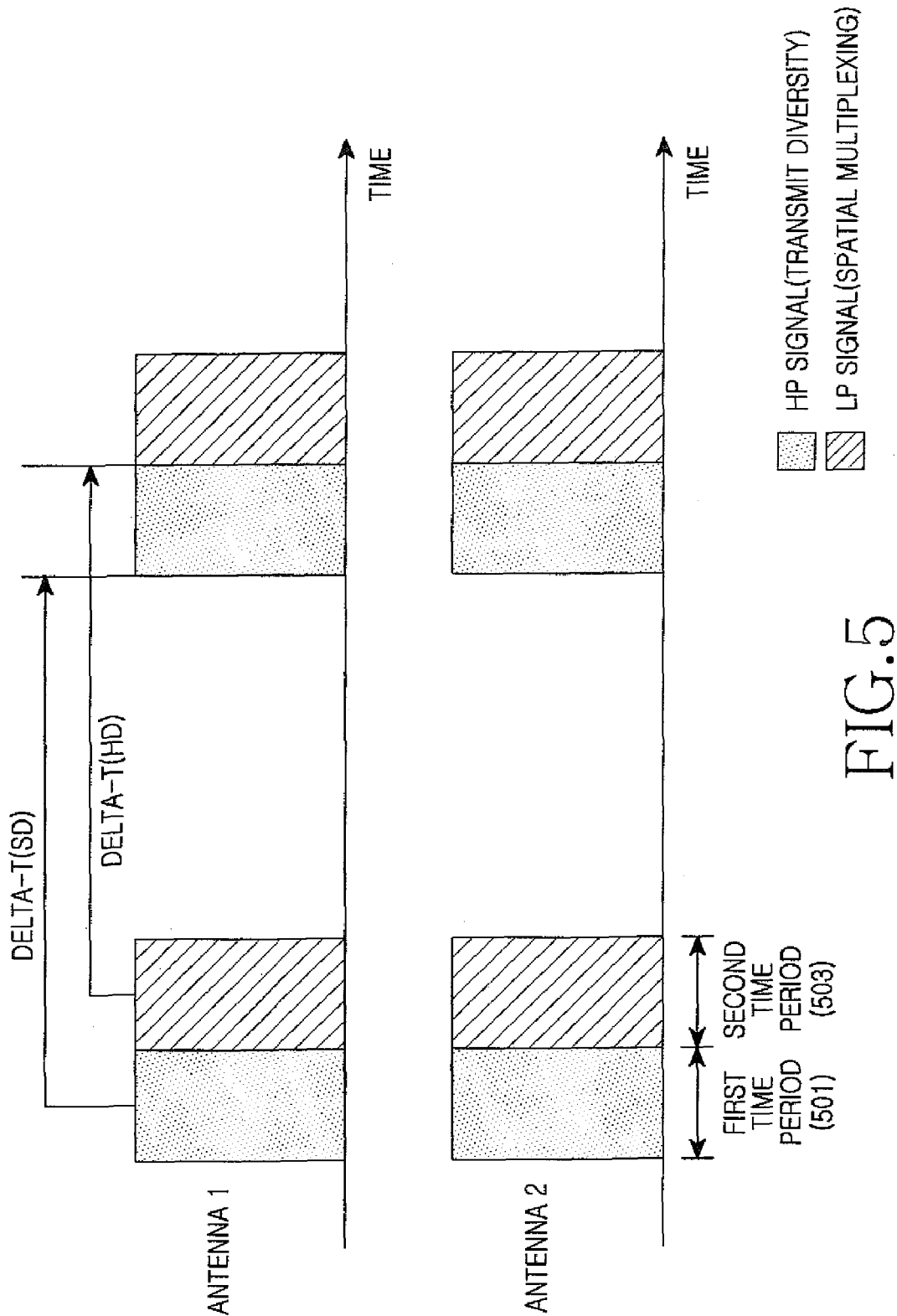
FIG. 5 is a diagram illustrating a time division structure of transmission data in a broadcasting system according to an exemplary embodiment of the present invention.

FIG. 5 illustrates a time division structure of transmission data in a broadcasting system according to an exemplary embodiment of the present invention.

As shown in FIG. 5, the broadcasting system transmits bursts at a high data rate for a short time (burst region). Thereafter, the broadcasting system operates in a transmission standby mode for a preset time.

For example, a transmission terminal of the broadcasting system transmits the HP signal via the antennas during a first time period 501. In addition, the transmission terminal transmits the LP signal via the antennas during a second time period 503. In another exemplary embodiment, the transmission terminal may transmit the LP signal for the first time period 501 and the HP signal for the second time period 503.

In this case, the broadcasting system may use substantially the same amount of transmission power when transmitting the bursts in the first time period 501 and in the second time period 503.

After transmitting the HP signal and the LP signal for the first and second time periods 501 and 503, the transmission terminal operates in a transmission standby mode for a preset time.

In this case, the time division multiplexer 314 outputs the HP signal supplied from the diversity modulator 312 to the resource allocators 318 for the first time period 501. Thereafter, the time division multiplexer 314 outputs the LP signal supplied from the spatial multiplexing modulator 313 to the resource allocators 318 for the second time period 503.

The controller 316 controls the diversity modulator 312, the spatial multiplexing modulator 313 and the time division multiplexer 314 so that the transmission terminal can transmit the broadcasting signals according to a time division structure.

A control signal generator 326 generates control signals including synchronization channel and resource information for allocating signals to be transmitted. Additionally, the control signal generator 326 generates control signals including TPS (Transmission Parameter Signaling) information. Here, the TPS information represents information for performing time division to reduce power loss. For example, the TPS information includes information on the time point at which a burst will be transmitted after a previous burst has been transmitted. In this case, the transmission terminal supplies control signals including the TPS information to reception terminals receiving broadcasting signals through an upper layer signaling. Therefore, the reception terminals can be aware of the time point for receiving the broadcasting signals using delta-T information supplied from the transmission terminal.

The resource allocators 318 allocate the data signals supplied from the time division multiplexer 314 and the control signals supplied from the control signal generator 326 to corresponding resources and output them.

The OFDM modulators 320 inverse-fast-Fourier-transform the frequency domain signals supplied from the resource allocators 318 and convert them into time domain signals.

The digital/analog converters 322 convert digital signals supplied from the OFDM modulators 320 into analog signals and output the analog signals.

The RF processors 324 modulate base-band signals supplied from the DACs 322 into radio frequency signals and output the radio frequency signals.

As described above, the broadcasting system separates the HP signal and the LP signal and transmits the HP signal using a diversity method and the LP signal using a spatial multiplexing method. In this case, the transmission terminal time-divides and transmits the HP signal and the LP signal by respective antennas using the time division structure as shown in FIG. 5. Here, when transmitting the HP signal and the LP signal in a structure as illustrated in FIG. 5, the transmission terminal can reduce interference among transmission signals.

Figure 6:
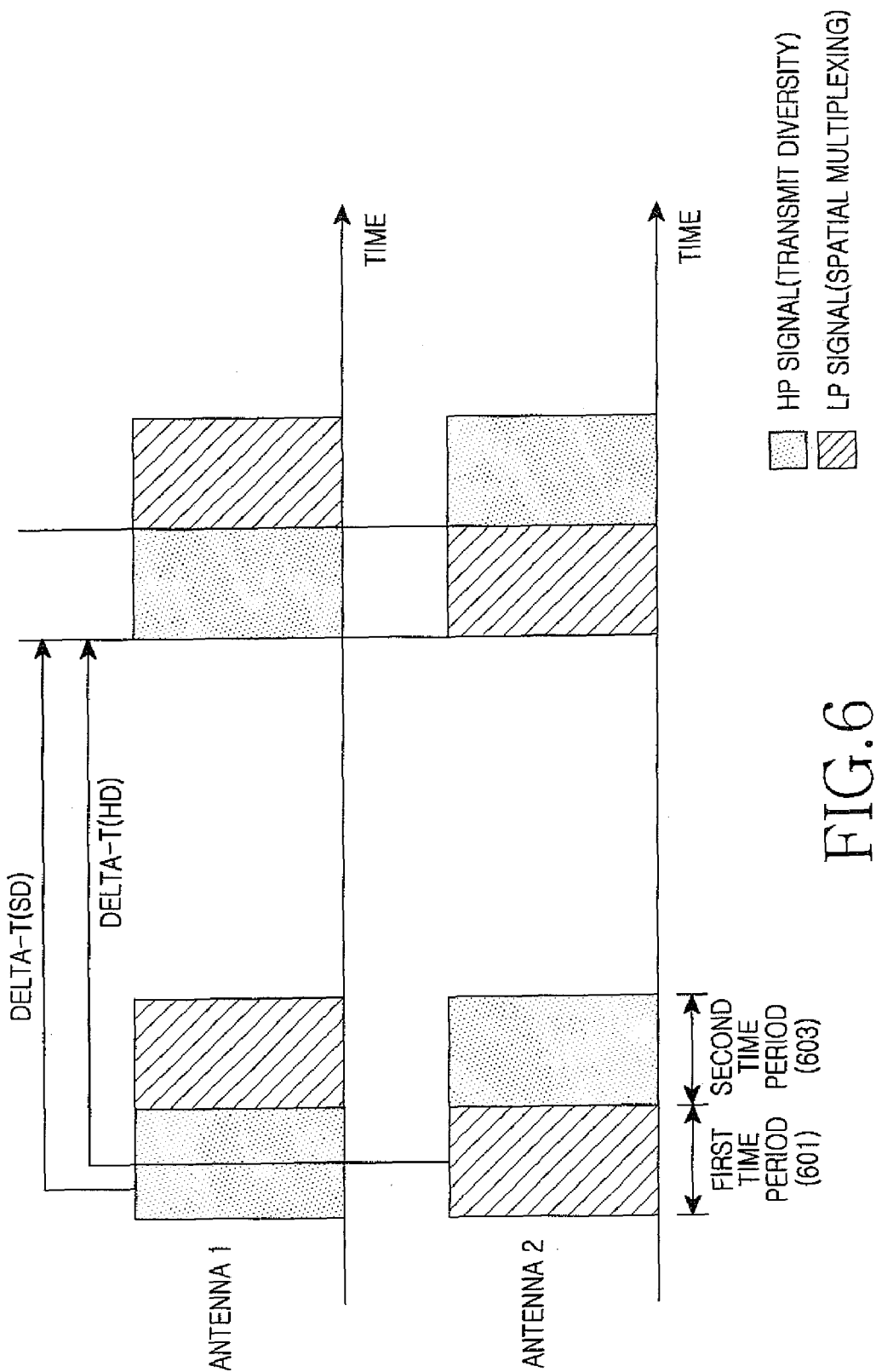
FIG. 6 is a diagram illustrating a time division structure of transmission data in a broadcasting system according to another exemplary embodiment of the present invention.

In another embodiment, the transmission terminal may transmit the HP signal and the LP signal using a time division as shown in FIG. 6.

FIG. 6 illustrates a time division structure of transmission data in a broadcasting system according to another exemplary embodiment of the present invention.

As shown in FIG. 6, the transmission terminal of the broadcasting system performs space-time division for the HP signal and the LP signal to set the time points of transmitting the HP signals and the LP signals via respective antennas to be different. For example, the transmission terminal transmits the HP signal via a first antenna and the LP signal via a second antenna during a first time period 601. In addition, the transmission terminal transmits the LP signal via the first antenna and the HP signal via the second antenna during a second time period 603. Here, the transmission power used when transmitting the bursts during the first time period 601 and the second time period 603 may be substantially identical.

The transmission terminal transmits the HP signal and the LP signal for the first and second time periods 601 and 603 and thereafter operates in a transmission standby mode for a preset time.

In this case, the time division multiplexer 314 of FIG. 3 outputs the HP signal supplied from the diversity modulator 312 to a first antenna path and the LP signal supplied from the spatial multiplexing modulator 313 to a second antenna path for the first time period 601. Thereafter, the time division multiplexer 314 outputs the LP signal supplied from the spatial multiplexing modulator 313 to the first antenna path and the HP signal supplied from the diversity modulator 312 to the second antenna path for the second time period 603. Here, the transmission power used when transmitting the bursts for the first time period 601 and the second time period 603 may be substantially identical.

In this case, the delta-T information of the HP signal and the delta-T information of the LP signal transmitted from the transmission terminal to reception terminals represent an identical time point.

When transmitting signals in a time division method as shown in FIG. 6, interference between the HP signal and the LP signal may occur, thus requiring removal of interference by the reception terminals.

Figure 7:
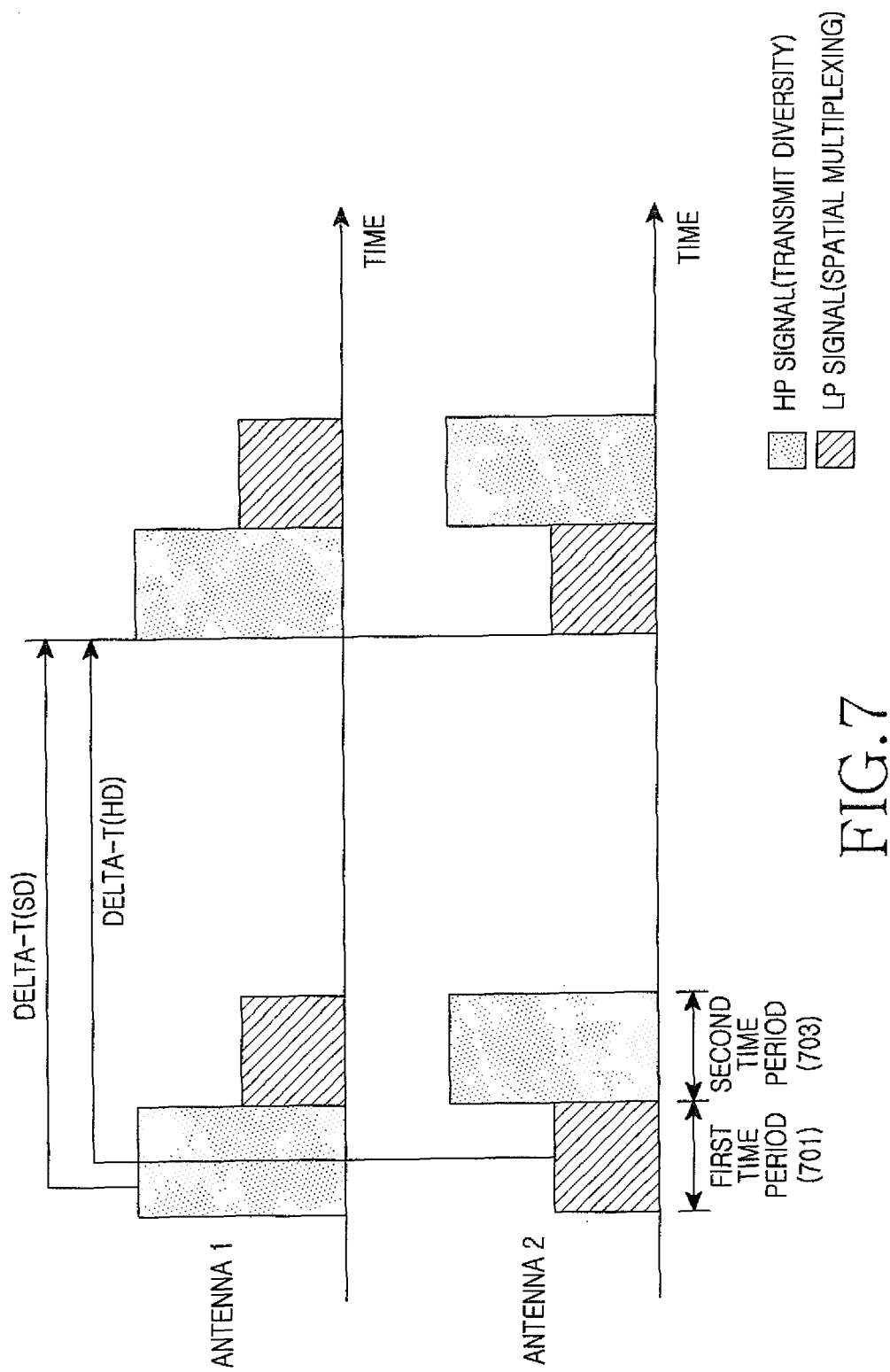
FIG. 7 is a diagram illustrating a time division structure of transmission data in a broadcasting system according to still another exemplary embodiment of the present invention.
Figure 8:
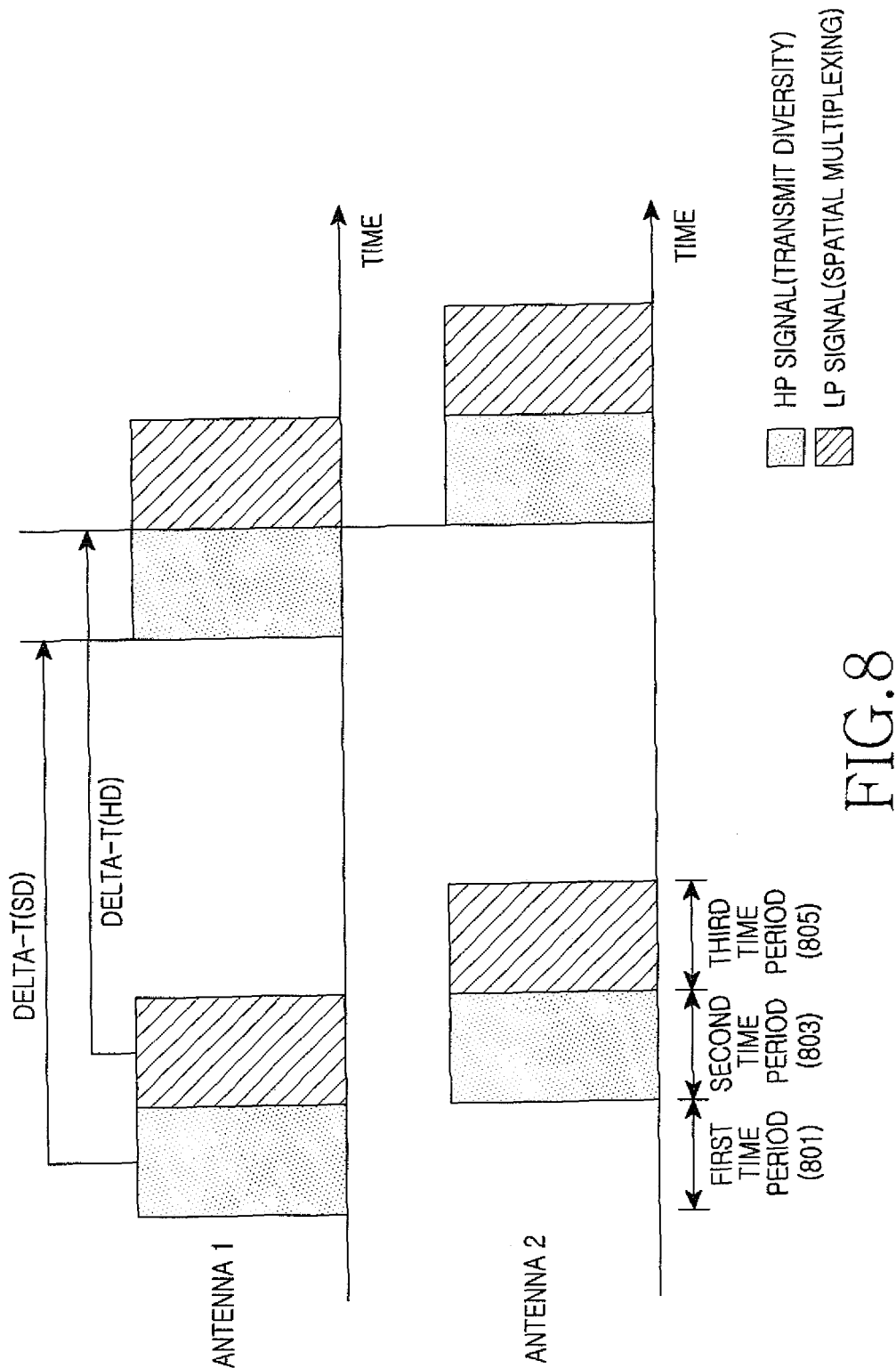
FIG. 8 is a diagram illustrating a time division structure of transmission data in a broadcasting system according to yet another exemplary embodiment of the present invention.

To reduce interference between the HP signal and the LP signal, the transmission terminal may perform space-time division for the HP signal and LP signal in the time division methods as shown in FIGS. 7, 8, and 9.

First, to reduce interference between the HP signal and the LP signal, the transmission terminal decreases the transmission power of the LP signal and transmits as shown in FIG. 7. That is, since the LP signal is used only by some reception terminals which have a good channel environment, the transmission terminal can reduce the transmission power of the LP signal.

FIG. 7 illustrates a time division structure of the transmission data in a broadcasting system according to still another exemplary embodiment of the present invention.

As shown in FIG. 7, the transmission terminal of the broadcasting system performs space-time division for the HP signal and the LP signal and sets a transmission time point and transmission power to be different for the antennas. In this case, the transmission terminal sets the power of the LP signal to be lower than that of the HP signal.

For example, the transmission terminal transmits the HP signal via a first antenna and the LP signal via a second antenna during a first time period 701. In this case, the transmission terminal sets the power of the LP signal transmitted via the second antenna to be lower than that of the HP signal.

In addition, the transmission terminal transmits the LP signal via the first antenna and the HP signal via the second antenna during a second time period 703. In this case, the transmission terminal sets the power of the LP signal transmitted via the first antenna to be lower than that of the HP signal.

The transmission terminal transmits the HP signal and the LP signal for the first and second time periods 701 and 703, and operates in a transmission standby mode for a preset time.

Next, to reduce interference between the HP signal and the LP signal, the transmission terminal delays a transmission time point of a second antenna as compared to that of a first antenna as shown in FIG. 8.

FIG. 8 illustrates a time division structure of transmission data in a broadcasting system according to yet another exemplary embodiment of the present invention.

As illustrated in FIG. 8, the transmission terminal of the broadcasting system performs space-time division for the HP signal and the LP signal and transmits them by setting the transmission time point to be different for the antennas. In this case, the transmission terminal delays the transmission time point of the second antenna as compared to that of the first antenna and then transmits the signals. For example, the transmission terminal transmits the HP signal via the first antenna during a first time period 801. Thereafter, the transmission terminal transmits the LP signal via the first antenna and the HP signal via the second antenna during a second time period 803.

Thereafter, the transmission terminal transmits the LP signal via the second antenna during a third time period 805. In this case, the transmission terminal may use substantially identical transmission powers when transmitting the bursts for the first, second and third time periods 801, 803 and 805, respectively.

The transmission terminal transmits the HP signal and the LP signal for the first, second and third time periods, 801, 803 and 805, and then operates in a transmission standby mode for a preset time.

In this case, the time division multiplexer 314 of FIG. 3 outputs the HP signal supplied from the diversity modulator 312 to a first antenna path for the first time period 801. Thereafter, the time division multiplexer 314 outputs the LP signal supplied from the spatial multiplexing modulator 313 to the first antenna path and the HP signal supplied from the diversity modulator 312 to the second antenna path for the second time period 803. Thereafter, the time division multiplexer 314 outputs the LP signal supplied from the spatial multiplexing modulator 313 to the second antenna path for the third time period 805. Here, the transmission power used when transmitting the bursts for the first, second and third time periods 801, 803 and 805 may be substantially identical.

In this case, delta-T information of the HP signal transmitted from the transmission terminal to reception terminals refers to a first time period of the next group of transmissions, and delta-T information of the LP signal represents a second time period.

Lastly, to reduce interference between the HP signal and the LP signal, the transmission terminal performs space-time division for the HP signal and transmits it as shown in FIG. 9.

FIG. 9 illustrates a time division structure of transmission data in a broadcasting system according to a further exemplary embodiment of the present invention.

As shown in FIG. 9, the transmission terminal of the broadcasting system performs space-time division for the HP signal and sets the transmission time point to be different for the antennas. In this case, the transmission terminal transmits the LP signal via the antennas at an identical transmission time point. For example, the transmission terminal transmits the HP signal via a first antenna during a first time period 901. Thereafter, the transmission terminal transmits the HP signal via a second antenna during a second time period 903.

Thereafter, the transmission terminal transmits the LP signal via the first and second antennas for a third time period 905. In this case, the transmission terminal may use substantially identical transmission power when transmitting bursts for the first, second and third time periods 901, 903 and 905.

The transmission terminal transmits the HP signal and the LP signal for the first, second and third time periods 901, 903 and 905, and then operates in a transmission standby mode for a preset time.

In this case, the time division multiplexer 314 of FIG. 3 outputs the HP signal supplied from the diversity modulator 312 to a first antenna path for the first time period 901. Then, the time division multiplexer 314 outputs the HP signal supplied from the diversity modulator 312 to the second antenna path for the second time period 903. Thereafter, the time division multiplexer 314 outputs the LP signal supplied from the spatial multiplexing modulator 313 to the first and second antenna paths for the third time period 905. Here, the transmission power used to transmit the bursts for the first, second and third time periods 901, 903 and 905 may be substantially identical.

In this case, delta-T information of the HP signal transmitted from the transmission terminal to reception terminals refers to a first time period of next group of transmissions, and delta-T information of the LP signal represents a third time period.

In the following description, an operating method of the transmission terminal for transmitting the HP signal using a diversity method and the LP signal using a spatial multiplexing method will be discussed.

Figure 4:
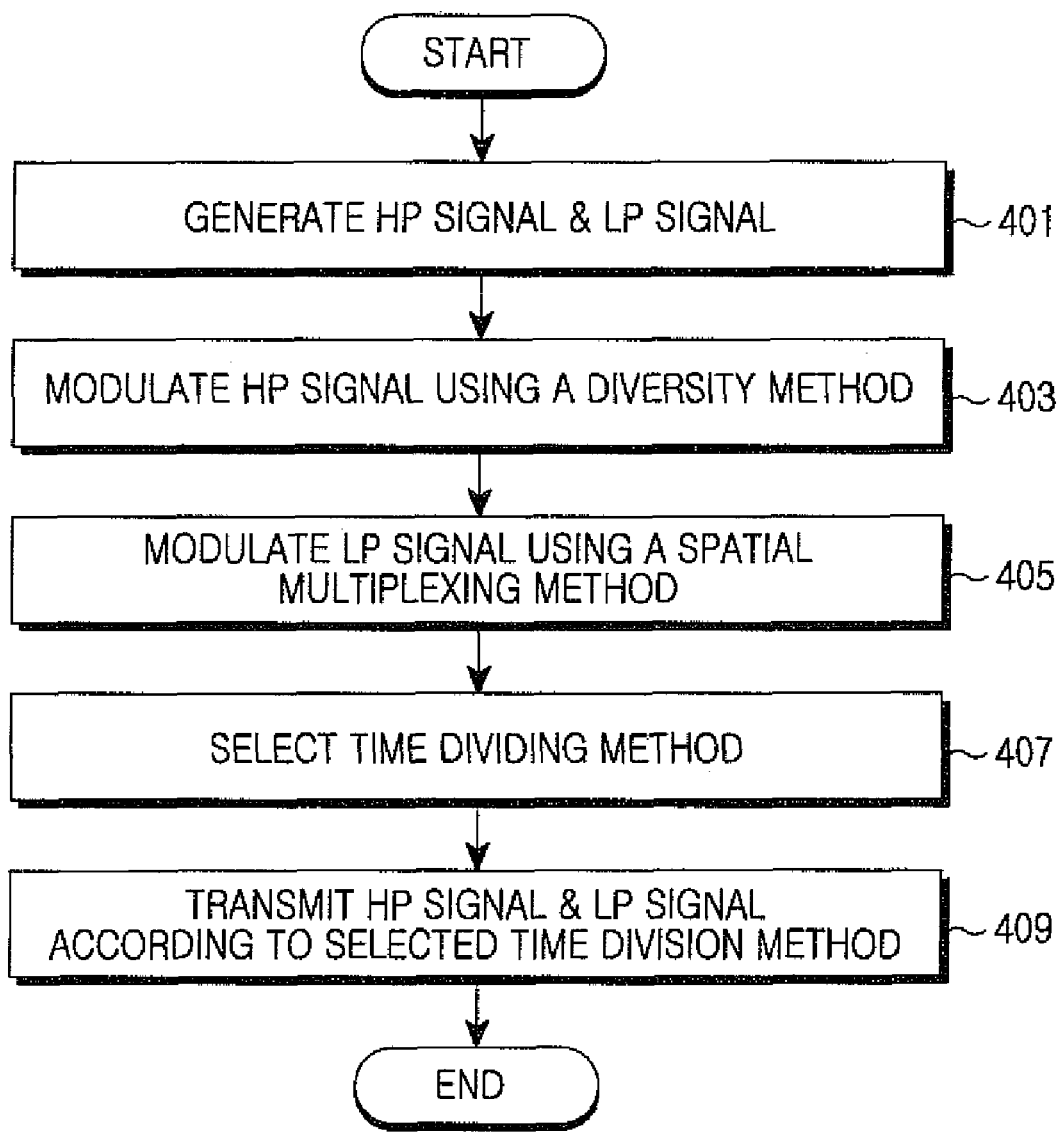
FIG. 4 is a diagram illustrating a procedure for selecting a multi-antenna transmission method in a broadcasting system according to an exemplary embodiment of present invention.

FIG. 4 illustrates a procedure for selecting multi-antenna transmission methods in a broadcasting system according to an exemplary embodiment of the present invention.

Referring to FIG. 4, in step 401, the transmission terminal performs a video coding and generates the HP signal and the LP signal to be transmitted to reception terminals. For example, the transmission terminal separates a bit stream generated using an H.264 video codec into the HP signal and the LP signal and outputs the HP signal and the LP signal.

After generating the HP signal and the LP signal, the transmission terminal proceeds to step 403 to perform modulation for transmitting the HP signal using a diversity method. For example, the transmission terminal modulates the HP signal using an Alamouti code.

Then, the transmission terminal performs modulation for transmitting the LP signal using a spatial multiplexing method in step 405. For example, the transmission terminal modulates the LP signal using a BLAST method.

After modulating the HP signal and the LP signal using the corresponding multi-antenna transmission methods, the transmission terminal proceeds to step 407 to select a time division method for transmitting the HP signal and the LP signal using the transmission antennas. For example, the transmission terminal selects any one of the time division methods for transmitting the HP signal and the LP signal as shown in FIGS. 5, 6, 7, 8 and 9.

If a time division method is selected, the transmission terminal proceeds to step 409 to transmit the HP signal and the LP signal via respective transmission antennas according to the selected time division method. Here, when the transmission terminal uses the time division method, the transmission signal includes delta-T information.

Thereafter, the transmission terminal completes this process.

Although the present disclosure has been described with an exemplary embodiment of the broadcasting system having two transmission antennas, it can be equally applied to broadcasting systems using more than two transmission antennas.

As described above, the present disclosure transmits signals through time division or space-time division using the antennas by using the multi-antenna transmission method, of a plurality of multi-antenna transmission methods, that is appropriate for the respective broadcasting services in a broadcasting system using a multi-antenna. Thereby, broadcasting services are supported for new terminals requiring a broadcasting quality of high definition while maintaining compatibility with reception terminals using a conventional broadcasting standard.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:
1. A signal transmission method in a broadcasting system using at least one antenna, comprising:
   generating two or more broadcasting signals, at least two of the two or more broadcasting signals being generated according to different user-required quality characteristics;

selecting one of a plurality of multi-antenna transmission methods for each of the broadcasting signals according to the user-required quality characteristics of the respective broadcasting signals;

modulating respective broadcasting signals according to the selected multi-antenna transmission method for each of the broadcasting signals;

determining time resources for transmitting the modulated broadcasting signals according to a time division method; and transmitting the modulated broadcasting signals via the at least one antenna using the determined time resources, wherein the modulating of the respective broadcasting signals comprises:
modulating at least one broadcasting signal having high priority using a diversity method; and
modulating at least one broadcasting signal having low priority using a spatial multiplexing method.

2. The method of claim 1, wherein the generating of the two or more broadcasting signals includes generating at least a broadcasting signal having low definition and high priority and at least a broadcasting signal having high definition and low priority.

3. The method of claim 1, wherein the plurality of multi-antenna transmission methods include at least one of a diversity method and a spatial multiplexing method.

4. The method of claim 1, wherein, the transmitting of the modulated broadcasting signals comprises:
transmitting broadcasting signals having low definition and high priority in a first time period for transmitting the broadcasting signals; and
transmitting broadcasting signals having high definition and low priority in a second time period for transmitting the broadcasting signals.

5. The method of claim 4, wherein the transmission power used to transmit the broadcasting signals for the first and second time periods is substantially identical.

6. The method of claim 1, wherein, the transmitting of the modulated broadcasting signals comprises:
transmitting broadcasting signals having low definition and high priority via a first antenna and broadcasting signals having high definition and low priority via a second antenna, in a first time period of transmitting the broadcasting signals; and
transmitting broadcasting signals having high definition and low priority via the first antenna and broadcasting signals having low definition and high priority via the second antenna, in a second time period of transmitting the broadcasting signals.

7. The method of claim 6, wherein the transmission power used to transmit the broadcasting signals for the first and second time periods is substantially identical.

8. The method of claim 6, wherein the broadcasting signals having high definition and low priority are transmitted with a lower transmission power than the broadcasting signals having low definition and high priority, for the first and second time periods.

9. The method of claim 1, wherein, the transmitting of the modulated broadcasting signals comprises:
transmitting broadcasting signals having low definition and high priority via a first antenna in a first time period for transmitting the broadcasting signals;
transmitting broadcasting signals having high definition and low priority via the first antenna and broadcasting signals having low definition and high priority via the second antenna in a second time period for transmitting the broadcasting signals; and
transmitting broadcasting signals having high definition and low priority via the second antenna in a third time period for transmitting the broadcasting signals.

10. The method of claim 9, wherein the transmission power used to transmit the broadcasting signals in the first, second and third time periods is substantially identical.

11. The method of claim 1, wherein, the transmitting of the modulated broadcasting signals comprises:
transmitting broadcasting signals having low definition and high priority via a first antenna in a first time period for transmitting the broadcasting signals;
transmitting broadcasting signals having low definition and high priority via a second antenna in a second time period for transmitting the broadcasting signals;
transmitting broadcasting signals having high definition and low priority via the first and second antennas in a third time period for transmitting the broadcasting signals.

12. The apparatus of claim 11, wherein transmission power used to transmit the broadcasting signals in the first, second and third time periods is substantially identical.

13. A transmission apparatus of a broadcasting system, comprising:
at least one antenna;
a signal generator for generating two or more broadcasting signals to be transmitted, at least two of the two or more broadcasting signals being generated according to different user-required quality characteristics;
a multi-antenna modulator for modulating each of the broadcasting signals according to one of a plurality of multi-antenna transmission methods selected for each of the broadcasting signals according to the user-required quality characteristics of the respective broadcasting signals; and
a transmitting unit for determining time resources for transmitting the modulated broadcasting signals according to a time division method, and for transmitting the modulated signals via the at least one antenna using the determined time resources,
wherein the multi-antenna modulator modulates broadcasting signals having high priority using a diversity method and signals having low priority using a spatial multiplexing method.

14. The apparatus of claim 13, wherein the generated two or more broadcasting signals comprise a broadcasting signal having low definition and high priority and a broadcasting signal having high definition and low priority.

15. The apparatus of claim 13, wherein, the transmitting unit transmits broadcasting signals having low definition and high priority in a first time period for transmitting the broadcasting signals and broadcasting signals having high definition and low priority in a second time period for transmitting the broadcasting signals.

16. The apparatus of claim 15, wherein the transmitting unit uses a substantially identical transmission power for the transmission of the broadcasting signals in the first and second time periods.

17. The apparatus of claim 13, wherein, the transmitting unit transmits broadcasting signals having low definition and high priority via a first antenna and broadcasting signals having high definition and low priority via a second antenna in a first time period for transmitting the broadcasting signals, and transmits broadcasting signals having high definition and low priority via the first antenna and broadcasting signals having low definition and high priority via the second antenna in a second time period for transmitting the broadcasting signals.

18. The apparatus of claim 17, wherein the transmitting unit uses a substantially identical transmission power for the transmission of the broadcasting signals in the first and second time periods.

19. The apparatus of claim 17, wherein the broadcasting signals having high definition and low priority are transmitted with a lower transmission power than the broadcasting signals having low definition and high priority in the first and second time periods.

20. The apparatus of claim 13, wherein, the transmitting unit transmits broadcasting signals having low definition and high priority via a first antenna in a first time period for transmitting the broadcasting signals, broadcasting signals having high definition and low priority via the first antenna and broadcasting signals having low definition and high priority via the second antenna in a second time period for transmitting the broadcasting signals, and broadcasting signals having high definition and low priority via the second antenna in a third time period for transmitting the broadcasting signals.

21. The apparatus of claim 20, wherein the transmitting unit uses a substantially identical transmission power for the transmission of the broadcasting signals in the first, second and third time periods.

22. The apparatus of claim 13, wherein, the transmitting unit transmits broadcasting signals having low definition and high priority via a first antenna in a first time period for transmitting the broadcasting signals, broadcasting signals having low definition and high priority via a second antenna in a second time period for transmitting the broadcasting signals, and broadcasting signals having high definition and low priority via the first and second antennas in a third time period for transmitting the broadcasting signals.

23. The apparatus of claim 22, wherein the transmitting unit uses a substantially identical transmission power for the transmission of the broadcasting signals in the first, second and third time periods.

* * * * *